March 17, 1931.                P. A. ROSSI                1,797,102
                          HEAT RETAINING DEVICE
                           Filed Sept. 4, 1928

Paul A. Rossi
INVENTOR

BY Victor J. Evans
ATTORNEY

Patented Mar. 17, 1931

1,797,102

UNITED STATES PATENT OFFICE

PAUL A. ROSSI, OF CAMPBELL, OHIO

HEAT-RETAINING DEVICE

Application filed September 4, 1928. Serial No. 303,901.

This invention relates generally to burners for gas, oil and electric stoves and the like, and has for an object the provision of means which may be either removably or permanently associated with a burner to retain heat ordinarily wasted, so as to utilize such heat for cooking or other purposes and thus reduce the consumption of fuel.

Another object of the invention is the provision of means which in addition to the above and other advantages, will provide a smooth flat surface for supporting a cooking utensil; act as a windshield for the flame, and support utensils of a smaller size than will the usual open top stove, without the use of ordinary plates or mats.

With the above and other objects in view, the invention further includes the following novel features and details of construction, to be hereinafter more fully described, illustrated in the accompanying drawing and pointed out in the appended claim.

In the drawing:—

Figure 1:
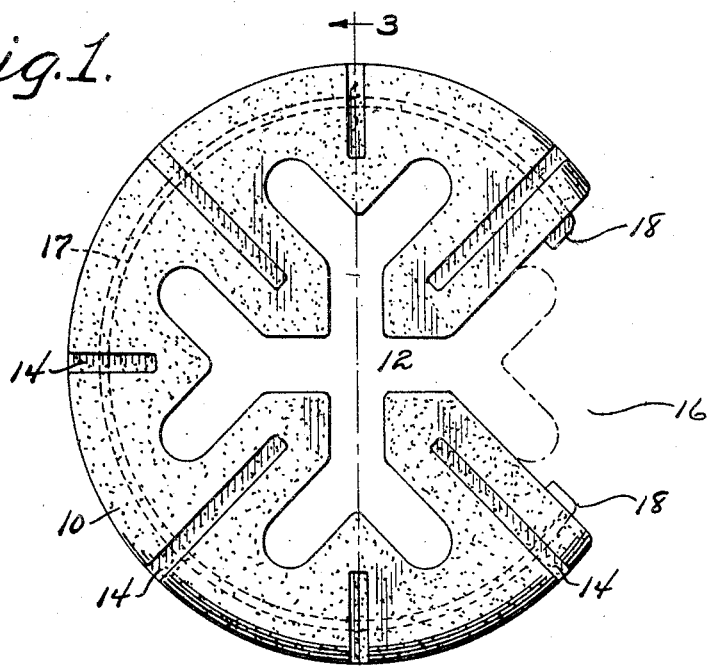
Figure 1 is a plan view of the invention.
Figure 2:
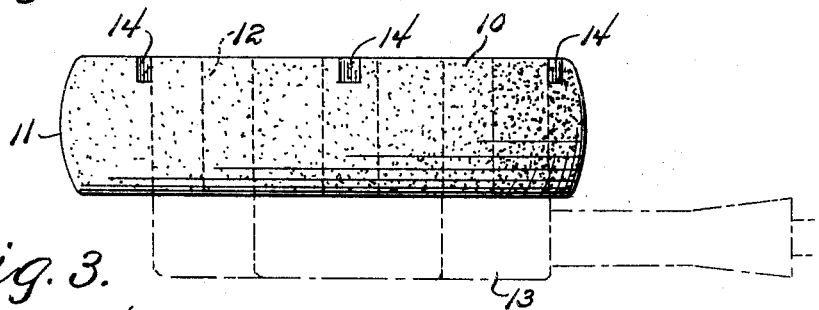
Figure 2 is an edge view with the burner shown by dotted lines.
Figure 3:
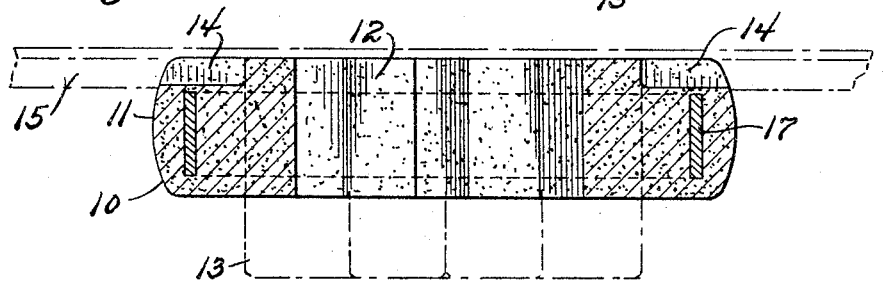
Figure 3 is a section on the line 3—3 of Figure 1 showing by dotted lines the position of a burner and the position of the grid fingers of an ordinary grid top stove.

Referring to the drawings in detail wherein like characters of reference denote corresponding parts, the invention comprises a relatively thick member 10 which is formed of suitable fire resisting heat retaining material and is provided with a flat bottom and top surface. The member 10 is of circular form and its peripheral edge is transversely rounded as shown at 11 so as to reduce danger of chipping or breaking the edge.

The member is provided with an opening 12 which extends therethrough for the accommodation of a burner 13, while the upper face of said member is provided with radially disposed inwardly extending recesses 14 to receive the grid fingers 15 which extend inwardly above the burner and form a part of the ordinary grid of an open top stove. As is well understood, these fingers usually provide a support for a cooking utensil.

The periphery of the member 10 is interrupted to provide a recess 16 which communicates with the burner opening 12 and is designed for the accommodation of an automatic or other lighter. Where a lighter is not provided, the member 10 may be continuous.

The member 10 is provided with a reinforcing strip 17 which extends around the burner opening 12 beneath the recesses 14 and has its opposite ends 18 bent over upon the walls of the recess 16. This strip 17 acts to prevent breakage of the member.

The member is designed to be placed in position with the grid fingers 15 within the recesses 14 and the opening 12 accommodating the burner. A smooth top will thus be provided above the burner and the heat therefrom will be applied directly to the bottom of a utensil placed upon the member 10. In addition, heat usually wasted will be absorbed and retained by the member 10 for an appreciable time after the burner flame has been extinguished. In addition, the member 10 will act as a guard or wind deflector to prevent the accidental extinguishing of the flame.

The invention is susceptible of various changes in its form, proportions and minor details of construction and the right is herein reserved to make such changes as properly fall within the scope of the appended claim.

Having described the invention what is claimed is:

In combination with a burner and a grid located thereabove and including inwardly extending fingers, a relatively thick flat fire resisting and heat retaining member of circular form having a burner receiving opening therethrough and provided at its top surface with radially extending recesses to receive said fingers, said member being interrupted at a point in its periphery to provide a space for the accommodation of a lighter.

In testimony whereof I affix my signature.

PAUL A. ROSSI.